United States Patent
Choi et al.

(10) Patent No.: US 10,637,111 B2
(45) Date of Patent: Apr. 28, 2020

(54) BATTERY MODULE HAVING IMPROVED COOLING DUCT SEALING PROPERTIES

(71) Applicant: LG CHEM, LTD., Seoul (KR)

(72) Inventors: Yong-Joon Choi, Daejeon (KR);
Ki-Youn Kim, Daejeon (KR);
Duck-Hee Moon, Daejeon (KR);
Jun-Yeob Seong, Daejeon (KR);
Sung-Chun Yu, Daejeon (KR);
Gang-U Lee, Daejeon (KR);
Jung-Hang Lee, Daejeon (KR);
Sang-Yoon Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 55 days.

(21) Appl. No.: 15/571,125

(22) PCT Filed: Sep. 29, 2016

(86) PCT No.: PCT/KR2016/010915
§ 371 (c)(1),
(2) Date: Nov. 1, 2017

(87) PCT Pub. No.: WO2017/057924
PCT Pub. Date: Apr. 6, 2017

(65) Prior Publication Data
US 2018/0175465 A1 Jun. 21, 2018

(30) Foreign Application Priority Data
Oct. 2, 2015 (KR) .......................... 10-2015-0139154

(51) Int. Cl.
*H01M 10/613* (2014.01)
*H01M 10/6563* (2014.01)
(Continued)

(52) U.S. Cl.
CPC ....... *H01M 10/613* (2015.04); *H01M 2/1077* (2013.01); *H01M 10/625* (2015.04);
(Continued)

(58) Field of Classification Search
CPC ............. H01M 10/613; H01M 2/1077; H01M 10/625; H01M 10/6556; H01M 10/6563;
(Continued)

(56) References Cited

U.S. PATENT DOCUMENTS 5,257,763 A * 11/1993 Nakamura ............. H02G 3/083
248/56
6,180,882 B1 * 1/2001 Dinh ........................ H02G 3/22
16/2.2
(Continued)

FOREIGN PATENT DOCUMENTS

EP  2410590 A2  1/2012
EP  2611637 A2  7/2013
(Continued)

OTHER PUBLICATIONS

Machine English translation of JP 2012-086039 (Year: 2012).*
International Search Report for PCT/KR2016/010915 (PCT/ISA/210) dated Feb. 1, 2017.

*Primary Examiner* — Michael L Dignan
(74) *Attorney, Agent, or Firm* — Birch, Stewart, Kolasch & Birch, LLP

(57) ABSTRACT

Provided is a battery module having improved sealing properties of a cooling duct. The battery module includes a battery stack, in which an inlet of an air flow path is opened at one side and an outlet of the air flow path is opened at another side, and a plurality of cooling ducts combined to two side portions of the battery stack to respectively communicate with the inlet of the air flow path and the outlet of the air flow path. At least one of the plurality of cooling ducts includes a plug accommodating part defining a
(Continued)

through hole, and a harness accommodating plug air-tightly inserted into the through hole and having a plurality of wire accommodating holes. The harness accommodating plug passes a wire of the internal harness or a wire of the external harness through the wire accommodating hole. The internal harness and the external harness are electrically combined around the harness accommodating plug.

15 Claims, 8 Drawing Sheets

(51) Int. Cl.
    *H01M 10/6556*    (2014.01)
    *H01M 10/625*     (2014.01)
    *H01M 2/10*      (2006.01)
    *H01M 10/42*     (2006.01)
    *H01M 10/48*     (2006.01)

(52) U.S. Cl.
    CPC ... *H01M 10/6556* (2015.04); *H01M 10/6563* (2015.04); *H01M 10/486* (2013.01); *H01M 2010/4271* (2013.01); *H01M 2220/20* (2013.01)

(58) Field of Classification Search
    CPC ........... H01M 10/486; H01M 2220/20; H01M 2010/4271; H01R 13/5816; H01R 13/74
    See application file for complete search history.

(56) References Cited

U.S. PATENT DOCUMENTS

| | | | | |
|---|---|---|---|---|
| 7,824,213 | B1* | 11/2010 | Korcz | H01R 13/5816 174/64 |
| 8,226,431 | B2* | 7/2012 | Reimchen | H01R 9/03 439/459 |
| 9,077,019 | B2* | 7/2015 | Kosaki | H01G 9/155 |
| 9,825,445 | B2* | 11/2017 | Metzler | H02G 3/088 |
| 2007/0188130 | A1* | 8/2007 | Scheucher | B60L 8/00 320/110 |
| 2010/0047682 | A1* | 2/2010 | Houchin-Miller | H01M 2/1077 429/120 |
| 2011/0129704 | A1 | 6/2011 | Han et al. | |
| 2013/0202936 | A1* | 8/2013 | Kosaki | H01G 9/155 429/99 |
| 2014/0209378 | A1* | 7/2014 | Chen | H02G 3/22 174/659 |
| 2015/0255774 | A1* | 9/2015 | Menzies | H01M 2/206 429/121 |
| 2015/0291045 | A1* | 10/2015 | Sugawara | H01M 2/1077 318/139 |
| 2015/0295344 | A1* | 10/2015 | Sawada | B60L 11/1818 439/587 |
| 2015/0357614 | A1 | 12/2015 | Sohn et al. | |
| 2016/0204478 | A1 | 7/2016 | Iguchi et al. | |
| 2017/0271634 | A1* | 9/2017 | Hasegawa | H01M 2/10 |

FOREIGN PATENT DOCUMENTS

| | | | |
|---|---|---|---|
| JP | 07-326403 A | 12/1995 | |
| JP | 2008-166208 A | 7/2008 | |
| JP | 2012-9277 A | 1/2012 | |
| JP | 2012-084363 A | 4/2012 | |
| JP | 2012-086039 * | 9/2012 | ............ H01R 13/52 |
| JP | 2012-186039 A | 9/2012 | |
| JP | 2014-032917 A | 2/2014 | |
| JP | 2015-158979 A | 9/2015 | |
| KR | 20-0430559 A | 11/2006 | |
| KR | 10-2011-0059252 A | 6/2011 | |
| KR | 10-2012-0094697 A | 8/2012 | |
| KR | 10-2014-0074411 A | 6/2014 | |
| WO | WO 2014/112732 A1 | 7/2014 | |
| WO | WO 2015/033694 A1 | 3/2015 | |

* cited by examiner

BATTERY MODULE HAVING IMPROVED COOLING DUCT SEALING PROPERTIES

TECHNICAL FIELD

The present disclosure relates to a battery module suitable for preventing a leakage of air from inside to outside of an air discharge structure along a surface of a harness at a region where the air discharge structure and the harness contact each other, when the harness is provided inside and outside of the sealed air discharge structure such that the air discharge structure is penetrated by the harness The present application claims priority to Korean Patent Application No. 10-2015-0139154 filed on Oct. 2, 2015 in the Republic of Korea, the disclosure of which is incorporated herein by reference.

BACKGROUND ART

Recently, in order to reduce air pollution caused by an exhaust gas of a vehicle, the vehicle is manufactured based on studies of obtaining driving power by using an internal combustion engine and/or an electric motor. In this regard, the vehicle has evolved in an order of a hybrid car, a plug-in hybrid car, and an electric car.

As well known, the hybrid car and the plug-in hybrid car include an internal combustion engine, an electric motor, and a battery pack, and the electric car includes an electric motor and a battery pack without an internal combustion engine.

The battery pack is configured to be chargeable inside and/or outside of the electric car. The battery pack includes a battery module including a battery stack and a plurality of ducts. The battery stack includes a plurality of cartridges that are sequentially stacked on each other, and at least one battery cell provided between the plurality of cartridges. The cartridge includes an air flow path penetrating one side surface to the other side surface of the cartridge, which face each other. The plurality of ducts surround, in a sandwich structure, two side surfaces of the battery stack where the air flow path is exposed, and guide a flow of air flowing into the plurality of cartridges and flowing out from the plurality of cartridges.

In this case, at least one of the plurality of ducts includes therein a blast fan, a driving motor, and a harness to compel inflow and outflow of air around the battery stack. The blast fan is connected to the driving motor and rotates, thereby forcing air to flow. The driving motor transmits driving power to the blast fan to adjust the number of rotations of the blast fan. The harness is connected to the driving motor to apply power to the driving motor or transmit an external electric signal for controlling a rotation speed of the blast fan to the driving motor while the blast fan rotates.

The harness is electrically connected to a battery management system (BMS) outside of the duct by penetrating the duct from inside to outside of the duct. Here, the BMS is a computing device controlling overall operations of the battery pack, including charging and discharging of the battery pack.

The harness includes wires bound in one unit and a coating of a resin material surrounding the wires. A cross-section of the harness is not uniform along a length direction of the harness because sectional shapes of the wires differ according to locations due to kinks and/or leaning of the wires in the harness.

Accordingly, the duct has a gap between an inner surface of a through hole and an outer surface of the harness, at a region where the harness penetrates the duct. The gap between the duct and the harness hinders the duct from being completely sealed. When the duct is not completely sealed, blasting pressure of air is decreased. As a result, an air flow generated inside the duct by the blast fan becomes irregular, and thus cooling efficiency of the battery stack deteriorates.

DISCLOSURE

Technical Problem

The present disclosure is designed to solve the problems of the related art, and therefore the present disclosure is directed to providing a battery module having improved sealing characteristic between a harness and a cooling duct combined around a battery stack.

Technical Solution

To solve the technical problems above, a battery module includes: a battery stack configured as a plurality of cartridges accommodating a battery cell are stacked and in which an inlet of an air flow path into which air flows is opened at one side and an outlet of the air flow path from which air is discharged is opened at another side; and a plurality of cooling ducts combined to two side portions of the battery stack to respectively communicate with the inlet of the air flow path and the outlet of the air flow path. The plurality of cooling ducts each include a duct housing, and at least one of a plurality of duct housings includes a plug accommodating part defining a through hole, and a harness accommodating plug air-tightly inserted into the through hole and having a plurality of wire accommodating holes.

Preferably, the battery module may include an internal harness including a plurality of wires, and an external harness including a plurality of corresponding wires respectively connected to the plurality of wires, wherein the plurality of wires or the plurality of corresponding wires are inserted into one side and protrude from another side of the plurality of wire accommodating holes.

Preferably, a cooling duct combined to the inlet of the air flow path and a cooling duct combined to the outlet of the air flow path may surround the battery stack in a sandwich structure.

Also, each duct housing may be opened towards the battery stack, have a convex shape at an opposite side of the battery stack, and communicate with the air flow path by adhering to a side wall of the battery stack.

According to an aspect, each of the plurality of duct housings including the plug accommodating part may define the through hole at an upper corner of the duct housing.

Preferably, the harness accommodating plug may be formed of a ductile and elastic material. For example, the ductile material may be silicon or rubber, but the present disclosure is not limited thereto.

Preferably, the harness accommodating plug may include a stopper block and an insertion part protruding from a top of the stopper block at a predetermined height. The stopper block may be located below the insertion part, and externally protrude and extend from a bottom edge of the insertion part, and the insertion part may have an uneven portion contacting an inner surface of the through hole along an outer circumferential surface thereof.

Preferably, the insertion part may be frictionally engaged through the through hole.

Preferably, the stopper block may shield the through hole by being hooked at a lower edge of the plug accommodating part below the through hole of the plug accommodating part inside the duct housing. Also, the insertion part may protrudes from the through hole by being inserted into the through hole of the plug accommodating part and be exposed outside the duct housing.

Preferably, the plurality of wire accommodating holes may air-tightly surround a surface of a wire passing each of the plurality of wire accommodating holes.

Preferably, an inner diameter of the plurality of wire accommodating holes may be slightly smaller than an outer diameter of the wire passing each of the plurality of wire accommodating holes. Accordingly, the wire and the wire accommodating hole, which correspond to each other, may air-tightly contact each other according to ductility and elasticity of the harness accommodating plug.

According to an aspect, the internal harness may be electrically connected to a driving motor configured to drive a blast fan provided on an inner wall of the duct housing.

According to another aspect, the internal harness may be electrically connected to a temperature sensor provided on the inner wall of the duct housing.

Preferably, the internal harness and the external harness may be electrically connected to each other around the harness accommodating plug.

Preferably, the battery module may further include a connector connected to an end portion of the external harness. A battery management system may be connected to the connector.

Advantageous Effects

According to the present disclosure, by removing a gap between a cooling duct and a harness by using a harness accommodating plug, air flowing in the cooling duct may be prevented from leaking through the gap.

As a result, cooling performance of a battery module may be improved by increasing a flow speed of air flowing through the cooling duct. Also, the use of the harness accommodating plug facilitates assembly of the harness and the cooling duct.

Also, since an external harness and an internal harness are electrically combined through a medium of the harness accommodating plug, maintenance is easy when a malfunction of the harness is repaired.

Also, since the harness accommodating plug and the harness are air-tightly adhered to each other, penetration of water or moisture into the cooling duct may be effectively prevented.

DESCRIPTION OF DRAWINGS

The accompanying drawings illustrate a preferred embodiment of the present disclosure and together with the foregoing disclosure, serve to provide further understanding of the technical concept of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one or more embodiments described below, a battery cell refers to a lithium secondary battery of a pouch type. Here, the lithium secondary battery is a generic term of a secondary battery in which an anode and a cathode cause an electrochemical reaction as a lithium ion operates as an active ion during charging and discharging. However, it is obvious that the present disclosure is not limited by a detailed type of a battery.

Figure 1:
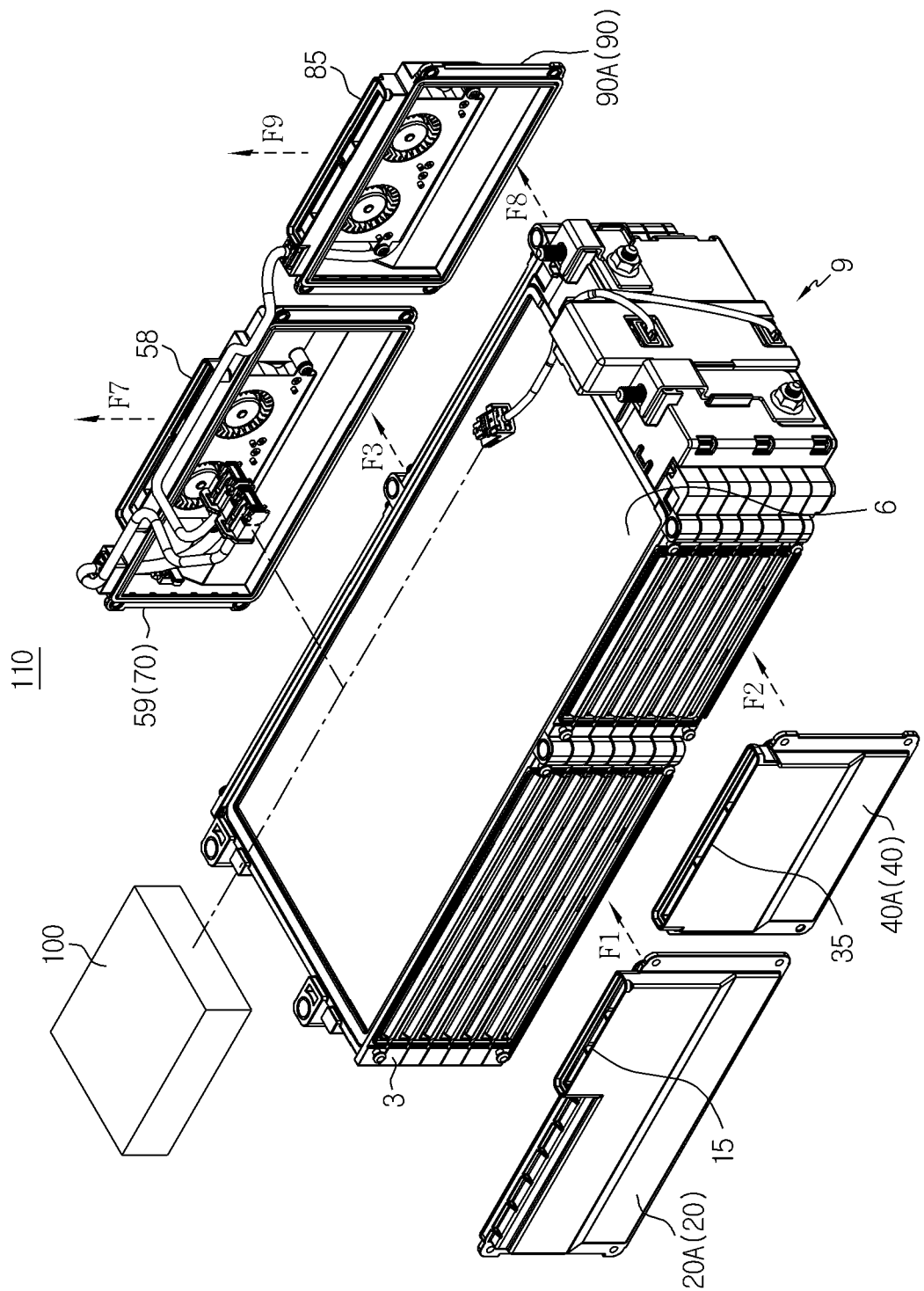
FIG. 1 is a perspective view of a battery module according to an embodiment of the present disclosure.

FIG. 1 is a perspective view of a battery module according to an embodiment of the present disclosure.

Referring to FIG. 1, the battery module 110 includes a battery stack 9, a plurality of cooling ducts 20, 40, 70, and 90, and a battery management system 100. The battery stack 9 includes a plurality of cartridges 3 that are vertically stacked, and a battery cell 6 accommodated in each cartridge 3.

The cartridge 3 has an air flow path (not shown) therein, and externally exposes the air flow path at two side walls facing the plurality of cooling ducts 20, 40, 70, and 90. The plurality of cooling ducts 20, 40, 70, and 90 are provided on two side portions of the battery stack 9 to surround the battery stack 9 in a sandwich structure.

The plurality of cooling ducts 20, 40, 70, and 90 include a plurality of duct housings 20A, 40A, 59, and 90A. The plurality of cooling ducts 20, 40, 70, and 90 may be adhered to two side walls of the battery stack 9 through edges of the plurality of duct housings 20A, 40A, 59, and 90A.

The plurality of cooling ducts 20, 40, 70, and 90 form two pairs around the battery stack 9, and are provided on one side portion and another side portion of the battery stack 9.

In detail, the cooling duct 20 is provided on the left when looking at the one side portion of the battery stack 9, and has an air inlet 15 at a top of the duct housing 20A.

The cooling duct 40 is provided on the right when looking at the one side portion of the battery stack 9 to adjoin the cooling duct 20, and has an air inlet 35 at a top of the duct housing 40A.

The cooling duct 70 is provided on the right when looking at the other side portion of the battery stack 9, and has an air outlet 58 at a top of the duct housing 59.

The cooling duct 90 is provided on the left when looking at the other side portion of the battery stack 9 to adjoin the cooling duct 70, and has an air outlet 85 at a top of the duct housing 90A.

The plurality of cooling ducts 20, 40, 70, and 90 introduce air into the battery stack 9, and externally discharge air from the battery stack 9.

The battery management system 100 is electrically connected to the battery stack 9 and the cooling ducts 70 and 90. Accordingly, the battery management system 100 controls repeated charging and discharging of the battery cell 6, and adjusts an amount of air introduced through the cooling ducts 20 and 40 and an amount of air discharged from the cooling ducts 70 and 90.

Figure 2:
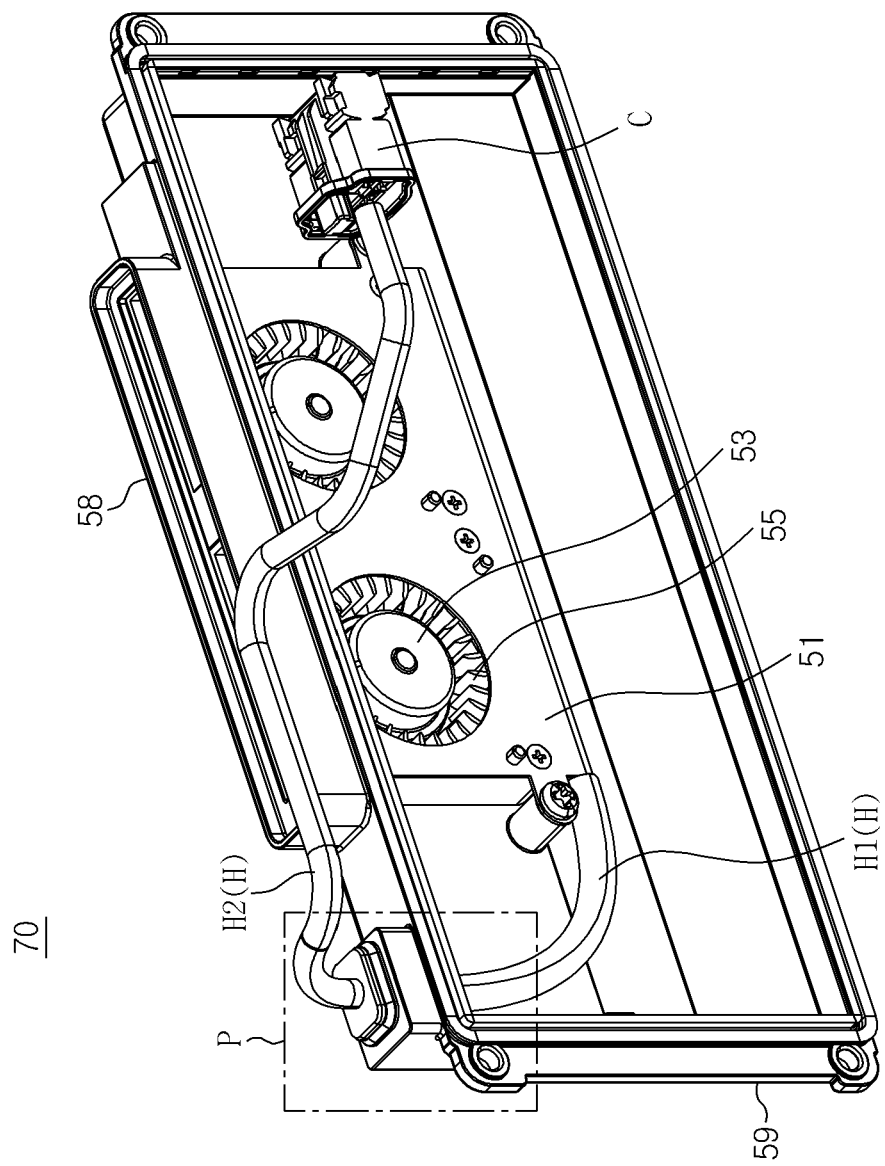
FIG. 2 is a perspective view of a structure of a cooling duct of FIG. 1.

FIG. 2 is a perspective view of a structure of a cooling duct of FIG. 1.

Referring to FIG. 2, the cooling duct 70 has the duct housing 59 opened towards the battery stack 9 of FIG. 1 and having a convex shape at an opposite side of the battery stack 9. The opening direction and the convex shape of the duct housing 59 may be substantially identically applied to each of the duct housings 20A, 40A, and 90A of FIG. 1.

Preferably, the cooling duct 70 includes a plurality of driving motors 53 and a plurality of blast fans 55 inside the duct housing 59, and a harness H penetrating the duct housing 59, and has the air outlet 59 at the top. The plurality of driving motors 53 and the harness H may be electrically connected to each other through an internal circuit of a connection part 51 inside the duct housing 59. Here, the numbers of driving motors 53 and blast fans 55 may increase or decrease according to required cooling performance.

The plurality of driving motors 53 are configured to respectively drive the plurality of blast fans 55. The harness H extends from inside to outside of the duct housing 59. Preferably, the harness H includes an internal harness H1 provided inside the duct housing 59 and an external harness H2 provided outside the duct housing 59.

Figure 7:
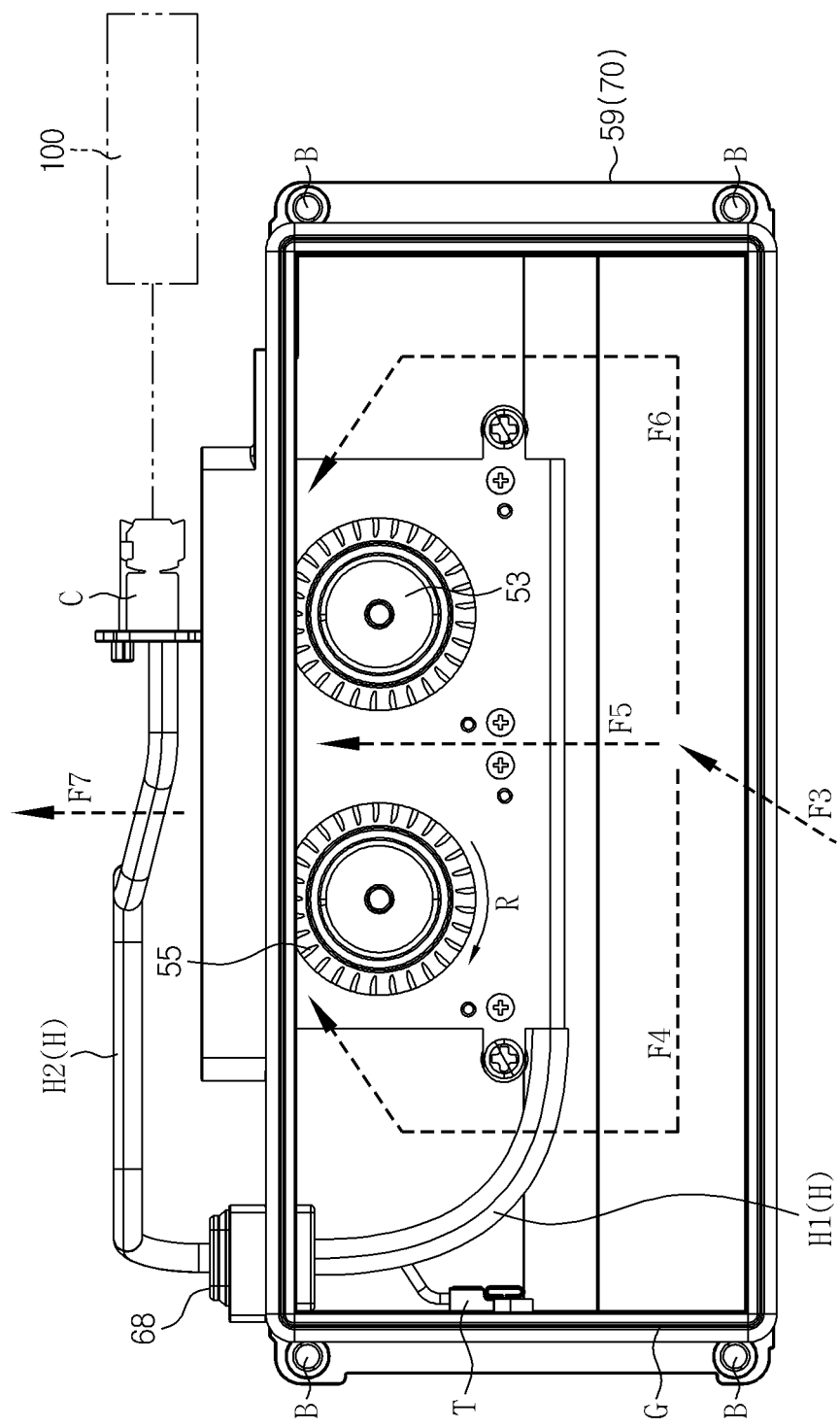

The external harness H2 includes a connector C at an end portion. The connector C may be electrically connected to the battery management system 100 as shown in FIGS. 1 and 7. Components of the duct housing 59 may be identically applied to the duct housing 90A of the cooling duct 90 of FIG. 1.

Meanwhile, the duct housing 59 may further include a temperature sensor T of FIG. 7 branched from the internal harness H1 and measuring a temperature of air inside the duct housing 59. The temperature sensor T may also be applied to the duct housing 90A of the cooling duct 90.

Figure 3:
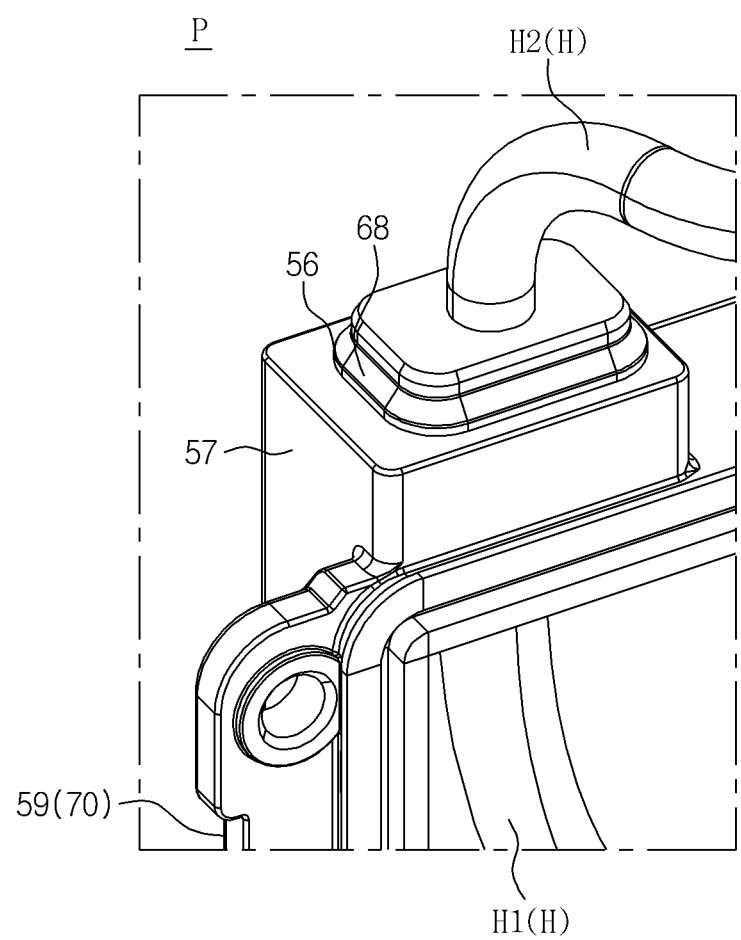
FIG. 3 is a partial perspective view illustrating in detail a combination structure of a duct housing and a harness by partially enlarging the cooling duct in a region P of FIG. 2.

FIG. 3 is a partial perspective view illustrating in detail a combination structure of a duct housing and a harness by partially enlarging the cooling duct in a region P of FIG. 2.

Referring to FIG. 3, the cooling duct 70 includes a harness accommodating plug 68 and the harness H penetrating the duct housing 59 at an edge of the duct housing 59. The harness accommodating plug 68 is provided at a through hole 56 of a plug accommodating part 57 at the edge of the duct housing 59.

Preferably, the harness accommodating plug 68 sufficiently fills the through hole 56 of the plug accommodating part 57, and has a top protruding from the plug accommodating part 57. The harness accommodating plug 68 is formed of a softer material than the duct housing 59, for example, the plug accommodating part 57, such as silicon or rubber. A material forming the harness accommodating plug 68 is not specifically limited as long as it is ductile and elastic.

The harness H includes the internal harness H1 provided inside the duct housing 59 and the external harness H2 provided outside the duct housing 59 to be connected through the harness accommodating plug 68.

A combination relationship of the plug accommodating part 57, the harness accommodating plug 68, and the harness H in the duct housing 59 may be identically applied to the duct housing 90A of the cooling duct 90 of FIG. 1.

FIGS. 4 through 7 are schematic views for describing a method of manufacturing the battery module of FIG. 1 and an operating mechanism of the cooling duct of FIG. 2.

Figure 4:
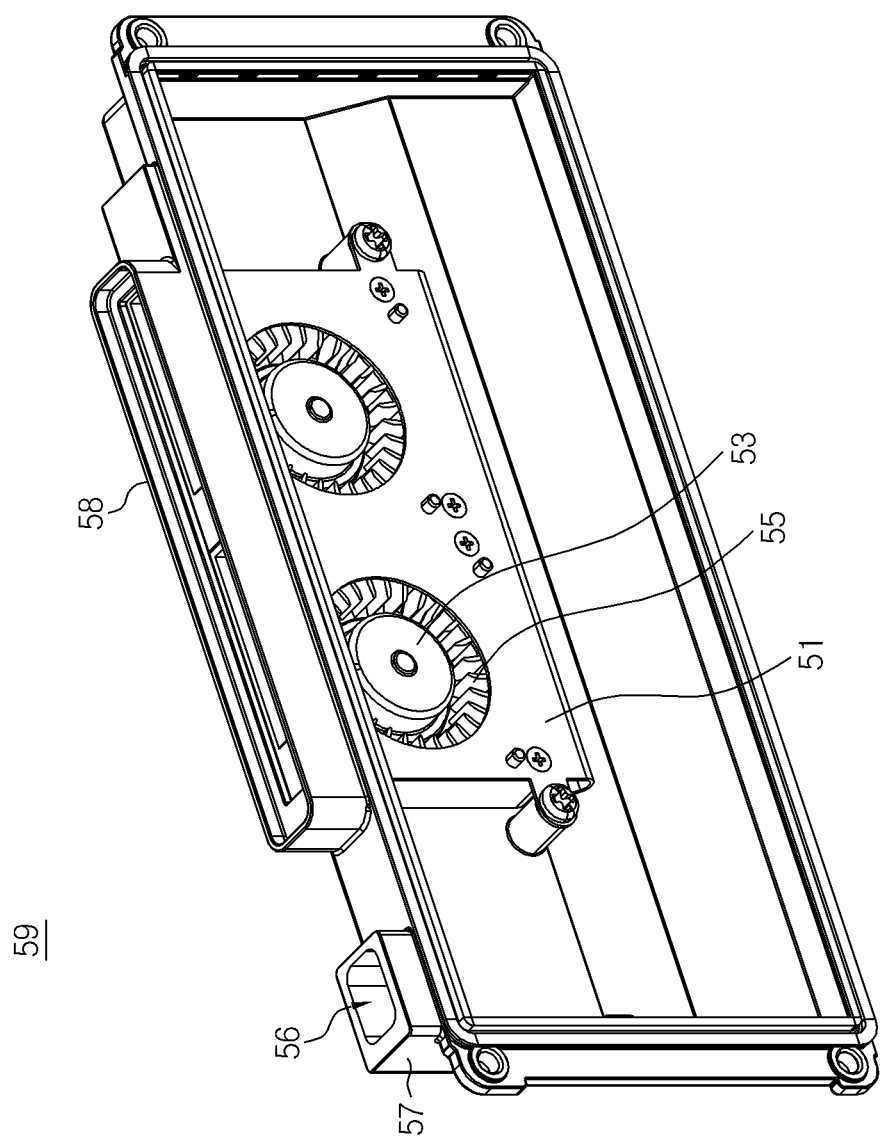
FIGS. 4 through 7 are views for describing processes of assembling the battery module of FIG. 1 and an operating mechanism of the cooling duct.

Referring to FIG. 4, the duct housing 59 may be provided together with the battery stack 9 and the duct housings 20A, 40A, and 90A of FIG. 1. The duct housing 59 includes the plurality of driving motors 53 and the plurality of blast fans 55, and has the plug accommodating part 57 at an upper corner. The plurality of driving motors 53 may be electrically connected to the internal circuit of the connection part 51. Preferably, the driving motor 53 may drive the blast fan 55. The plug accommodating part 57 has the through hole 56 externally exposing the inside of the duct housing 59. Such a structure may also be applied to the duct housing 90A.

Figure 5:
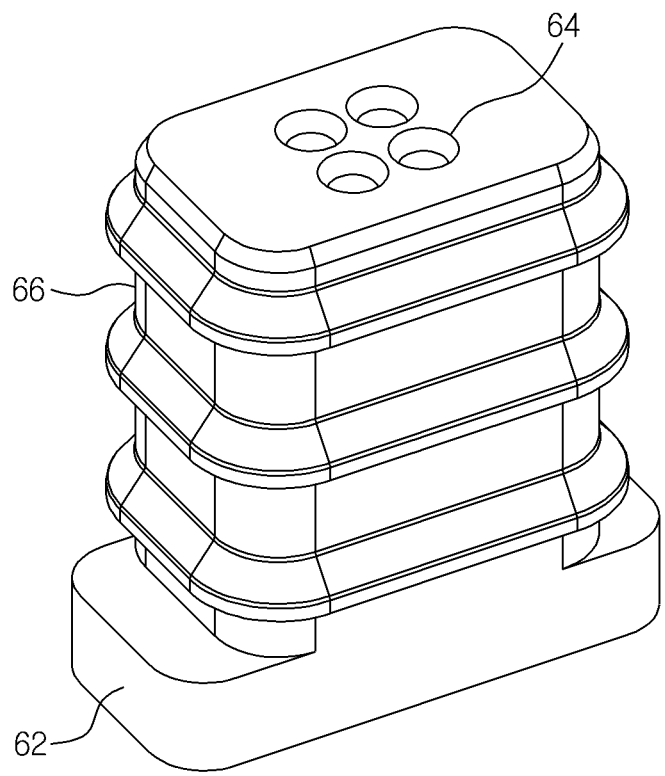

Referring to FIG. 5, the harness accommodating plug 68 may be prepared. The harness accommodating plug 68 includes a stopper block 62 and an insertion part 66, which are integrally formed. The stopper block 62 is provided below the insertion part 66 to support the insertion part 66. Preferably, the stopper block 62 protrudes towards two side portions of the insertion part 66 below the insertion part 66 such as to have a larger size than the insertion part 66 when viewed from the top.

The insertion part 66 is provided inside an occupied area of the stopper block 62, on the stopper block 62. Preferably, the insertion part 66 has repetitive uneven shapes (凹凸) from a lower portion to an upper portion on an outer circumferential surface. The stopper block 62 and the insertion part 66 include a plurality of wire accommodating holes 64. The plurality of wire accommodating holes 64 sequentially penetrate the stopper block 62 and the insertion part 66.

Figure 6:
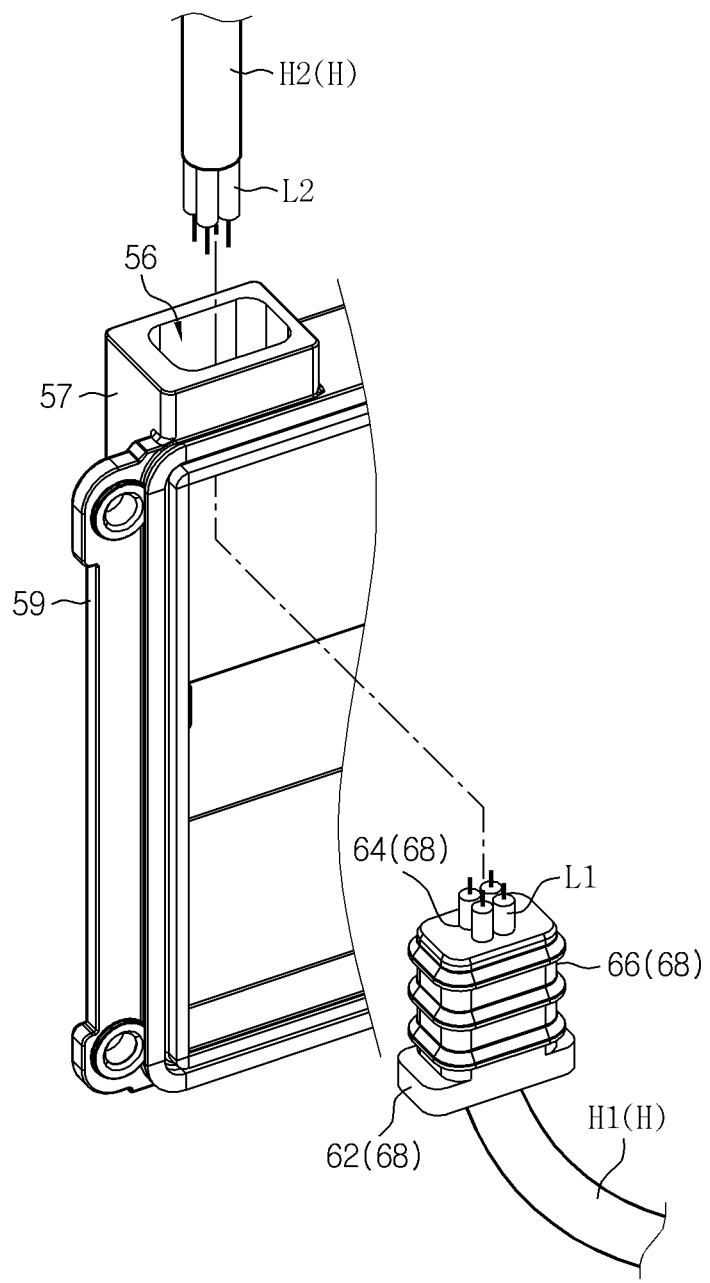

Referring to FIG. 6, the internal harness H1 and the external harness H2 may be prepared. A coating of the internal harness H1 may be cut at one end portion. After the coating of the internal harness H1 is cut, a plurality of first wires L1 may be externally exposed from the one end portion through the coating of the internal harness H1.

Continuously, the internal harness H1 may be inserted into the harness accommodating plug 68. In detail, the plurality of first wires L1 of the internal harness H1 may be respectively inserted into the plurality of wire accommodating holes 64 below the stopper block 62 of the harness accommodating plug 68, and may protrude upward from the insertion part 66 of the harness accommodating plug 68 through the plurality of wire accommodating holes 64.

The plurality of first wires L1 respectively sufficiently fill the plurality of wire accommodating holes 64. Accordingly, the harness accommodating plug 68 may air-tightly surround the plurality of first wires L1 through the plurality of wire accommodating holes 64.

A diameter of each first wire L1 may be slightly larger than an inner diameter of the corresponding wire accommodating hole 64. In this case, an outer surface of each first wire L1 may air-tightly adhere to an inner wall of the corresponding wire accommodating hole 64 through ductility and elasticity of the harness accommodating plug 68.

Next, the harness accommodating plug 68 may be inserted into the plug accommodating part 57 of the duct housing 59.

In detail, the harness accommodating plug 68 may be inserted into the through hole 56 of the plug accommodating part 57 inside the duct housing 59, and may protrude upward from the plug accommodating part 57 through the through hole 56 of the plug accommodating part 57. In this case, the stopper block 62 of the harness accommodating plug 68 shields the through hole 56 by being hooked at a lower edge of the plug accommodating part 57 below the through hole 56 of the plug accommodating part 57 inside the duct housing 59, and the insertion part 66 of the harness accommodating plug 68 protrudes from the through hole 56 by being inserted into the through hole 56 of the plug accommodating part 57 and is exposed outside the duct housing 59.

The harness accommodating plug 68 may sufficiently fill the through hole 56 of the plug accommodating part 57 by using the uneven shapes of the insertion part 66. Also, each uneven shape may provide air-tightness by contacting an inner wall of the through hole 56. In particular, when the harness accommodating plug 68 is formed of a material having ductility and elasticity, such as silicon or rubber, air-tightness provided by each uneven shape may be further increased.

Preferably, an area formed by a circumference of a portion where the uneven shapes exist may be slightly larger than an area formed by a cross-section of the through hole 56. In this case, when the harness accommodating plug 68 is inserted into the through hole 56, the portion where the uneven shapes exist may be air-tightly adhered to the inner wall of the through hole 56 by ductility and elasticity of the harness accommodating plug 68.

After the harness accommodating plug 68 is inserted into the through hole 56 of the plug accommodating part 57, the internal harness H may be connected to the connection part 51 of the duct housing 59 through the other end portion.

Selectively, a center region of the coating of the internal harness H1 may be cut such that one of the plurality of first wires L1 is electrically connected to the temperature sensor T of FIG. 7. After the electric connection between the internal harness H1 and the temperature sensor T, a coating of the external harness H2 may be cut at one end portion. The external harness H2 may externally expose a plurality of second wires L2 at the one end portion through the coating.

The number of plurality of second wires L2 is the same as the number of plurality of first wires L1. The plurality of second wires L2 may be respectively connected to the plurality of first wires L1 over the harness accommodating plug 68. Connected regions of the plurality of first wires L1 and the plurality of second wires L2 may be covered by an insulating coating, such as a heat shrink tape, so as to prevent the connected regions from contacting a neighboring structure.

The external harness H2 may be connected to the connector C as shown in FIG. 7, at the other end portion, for example, at the opposite side of the harness accommodating plug 68. Accordingly, the external harness H2 may form the harness H of FIG. 7 together with the internal harness H1. The harness H, the duct housing 59, and the harness accommodating plug 68 may form the cooling duct 70 of FIG. 2 or 7.

An assembly method of the cooling duct 70 may be similarly applied while assembling a cooling duct to which a harness is combined, for example, the cooling duct 90 of FIG. 1. However, a combining process of the harness accommodating plug 68 and a duct housing may be omitted in the cooling ducts 20 and 40 to which a harness is not combined.

Meanwhile, according to a modified example of the present disclosure, the plurality of second wires L2 of the external harness H2 may be respectively inserted into the plurality of wire accommodating holes 64 of the harness accommodating plug 68, instead of the plurality of first wires II of the internal harness H1. In this case, the harness accommodating plug 68 may surround the plurality of second wires L2 through the plurality of wire accommodating holes 64. The plurality of first wires L1 may be provided inside the duct housing 59 to be respectively connected to the plurality of second wires L2 below the plurality of wire accommodating holes 64.

According to the modified example, a diameter of each second wire L2 may be slightly larger than an inner diameter of the corresponding wire accommodating hole 64. In this case, an outer surface of each second wire L2 may be air-tightly adhered to an inner wall of the corresponding wire accommodating hole 64 through ductility and elasticity of the harness accommodating plug 68.

Hereinafter, the operating mechanism of the cooling duct 70 described above will be described with reference to FIG. 7.

The cooling duct 70 may be combined to the battery stack 9, together with the remaining cooling ducts 20, 40, and 90 of FIG. 1. In other words, the plurality of duct housings 20A, 40A, 59, and 90A may be adhered to the side portions of the battery stack 9 so as to communicate with air flow paths of the cartridges 3 of the battery stack 9.

According to an embodiment, a sealing gasket G formed of a rubber material and having a ring shape may be applied to a region of the battery stack 9 contacted by the cooling ducts 20, 40, 70, and 90.

Also, a plurality of holes B may be formed at edges of the cooling ducts 20, 40, 70, and 90. The cooling ducts 20, 40, 70, and 90 may be bolted to the side portions of the battery stack 9 by using the plurality of holes B.

In this regard, a bolt fastening hole, in which a screw thread is formed on an inner wall, may be formed on regions of the battery stack 9 corresponding to the plurality of holes B such that a bolt is fastened thereto.

According to another embodiment, the cooling ducts 20, 40, 70, and 90 may be hot stacked on the side portions of the battery stack 9 by using the plurality of holes B.

Figure 8:
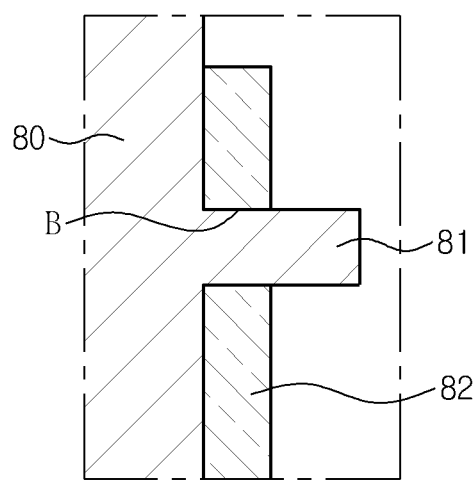
FIGS. 8 and 9 are partial cross-sectional views of a point where hot stacking is performed when a duct housing is combined to a side portion of a battery stack via hot stacking.
Figure 9:
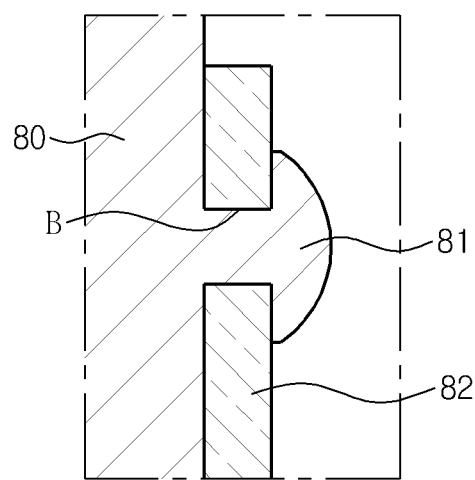

In this case, a rod 81 may protrude from a region 80 of the battery stack 9 to which the cooling ducts 20, 40, 70, and 90 are combined as shown in FIG. 8, and the rod 81 may be inserted into the hole B formed at a corner region 82 of each cooling duct. Then, heat is applied to an end portion of the rod 81 to change a shape, thereby firmly combining the corner region 82 where the hole B is formed to the battery stack 9 as shown in FIG. 9.

In this regard, the region 80 of the battery stack 9 corresponding to the hole B may be formed of a plastic material. According to an embodiment, the region 80 of the battery stack 9 may be a cartridge.

Also, the harnesses H of the cooling ducts 70 and 90 may be electrically connected to the battery management system 100 through the connectors C outside the duct housings 59 and 90A, as shown in FIG. 1. Here, since the cooling ducts 70 and 90 have similar components, descriptions of the cooling duct 70 may be substantially identically applied to the cooling duct 90.

The battery management system 100 may transmit a motor driving signal to the plurality of driving motors 53 through the harness H. The plurality of driving motors 53 may respectively rotate the plurality of blast fans 55 in one direction indicated by an arrow R according to the motor driving signal.

The plurality of blast fans 55 included in the cooling duct 70 and a plurality of blast fans included in the cooling duct 90 may form air flows F1, F2, F3, and F8 as shown in FIG. 1, between the battery stack 9 and the plurality of cooling ducts 20, 40, 70, and 90.

The cooling duct 70 distributes the air flow F3 discharged from the battery stack 9 into a plurality of air flows F4, F5, and F6.

Most of the air flow F4 does not head towards the harness accommodating plug 68 provided at an edge of the duct housing 59. In other words, the air flow F4 is mostly formed in remaining regions excluding regions between the duct housing 59 and the harness accommodating plug 68 and between the harness accommodating plug 68 and the plurality of first wires L1 of the internal harness H1.

Meanwhile, the duct housing 59 includes the temperature sensor T connected to the internal harness H1 of the harness H, wherein the temperature sensor T detects a temperature of air inside the duct housing 59 and transmits a temperature measuring signal to the battery management system 100 through the harness H. Then, upon receiving the temperature measuring signal, the battery management system 100 may adjust revolution per minute (RPM) of the plurality of driving motors 53.

The air flows F4, F5, and F6 pass through the air outlet 58 of the duct housing 59 by the plurality of blast fans 55 to combine as one air flow F7.

Similarly, the air flow F8 of FIG. 1 may pass through the air outlet 85 of the duct housing 90A by a plurality of driving motors and a plurality of blast fans (see FIG. 1) provided inside the duct housing 90A in the cooling duct 90 to form an air flow F9.

In the above embodiments, a blast fan is provided at the cooling ducts 70 and 90 that externally discharge air. However, a blast fan may be further provided at the cooling ducts 20 and 40 that introduce air. In this case, cooling performance of a battery module may be further increased.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

According to the present disclosure, by removing a gap between a cooling duct and a harness by using a harness accommodating plug, air flowing in the cooling duct may be prevented from leaking through the gap.

As a result, cooling performance of a battery module may be improved by increasing a flow speed of air flowing through the cooling duct. Also, the use of the harness accommodating plug facilitates assembly of the harness and the cooling duct.

Also, since an external harness and an internal harness are electrically combined through a medium of the harness accommodating plug, maintenance is easy when a malfunction of the harness is repaired.

Also, since the harness accommodating plug and the harness are air-tightly adhered to each other, penetration of water or moisture into the cooling duct may be effectively prevented.

What is claimed is:

1. A battery module comprising:
   a battery stack having a first side and a second side opposite the first side, an inlet of an air flow path at the first side and an outlet of the air flow at the second side; and
   a plurality of cooling ducts, the plurality of cooling ducts including at least one cooling duct at the first side of the battery stack and at least one cooling duct at the second side of the battery stack to respectively communicate with the inlet of the air flow path and the outlet of the air flow path,
   wherein the plurality of cooling ducts each comprise a convex duct housing having an end wall and a flange extending from the end wall to form a top wall, a bottom wall and a pair of side walls and create an interior space, and
   wherein at least one of the plurality of cooling ducts comprises:
   a plug accommodating part defining a through hole in the duct housing;
   a harness accommodating plug air-tightly inserted into the through hole and having a plurality of wire accommodating holes;
   a harness, in which an internal harness and an external harness are combined, extending from outside to inside of the duct housing by passing through the harness accommodating plug;
   a fan mounted on the end wall of the duct housing, the internal harness connected to the fan; and
   an air port in the top wall of the duct housing, the air port aligned with the fan,
   wherein a plurality of wires of the internal harness or a plurality of corresponding wires of the external harness are inserted into one side and protrude from another side of the plurality of wire accommodating holes,
   wherein the plurality of wires and the plurality of corresponding wires are electrically connected to each other,
   wherein the harness accommodating plug comprises a stopper block and an insertion part protruding from a top of the stopper block at a predetermined height,
   wherein the stopper block is located below the insertion part, and externally protrudes and extends from a bottom edge of the insertion part, and
   wherein the insertion part has repetitive uneven shapes from a lower portion to an upper portion on an outer circumferential surface of the insertion part.

2. The battery module of claim 1, wherein the at least one cooling duct at the first side of the battery stack and the at least one cooling duct at the second side of the battery stack surround the battery stack in a sandwich structure.

3. The battery module of claim 1, wherein each duct housing communicates with the air flow path by adhering to a side wall of the battery stack.

4. The battery module of claim 1, wherein each of the plurality of cooling ducts comprising the plug accommodating part defines the through hole at an upper corner thereof.

5. The battery module of claim 1, wherein the harness accommodating plug is formed of a ductile material.

6. The battery module of claim 5, wherein the ductile material is silicon or rubber.

7. The battery module of claim 1, wherein the insertion part is frictionally engaged through the through hole.

8. The battery module of claim 1, wherein the stopper block shields the through hole by being hooked at a lower edge of the plug accommodating part below the through hole of the plug accommodating part inside the duct housing, and
wherein the insertion part protrudes from the through hole by being inserted into the through hole of the plug accommodating part and is exposed outside the duct housing.

9. The battery module of claim 1, wherein the plurality of wire accommodating holes air-tightly surround a surface of a wire passing each of the plurality of wire accommodating holes.

10. The battery module of claim 1, wherein the internal harness is electrically connected to a driving motor configured to drive the fan.

11. The battery module of claim 10, wherein the internal harness is electrically connected to a temperature sensor provided on the inner surface of the duct housing.

12. The battery module of claim 1, wherein the internal harness and the external harness are electrically connected to each other at the harness accommodating plug.

13. The battery module of claim 1, further comprising a connector connected to an end portion of the external harness.

14. The battery module of claim 13, further comprising a battery management system connected to the connector.

15. The battery module of claim 1, wherein the internal harness has a first end inside the at least one of the plurality of cooling ducts and a second end,
wherein the external harness has a first end and a second end connected to a connector, and
wherein the second end of the internal harness is connected to the first end of the external harness.

* * * * *